Figure 1:
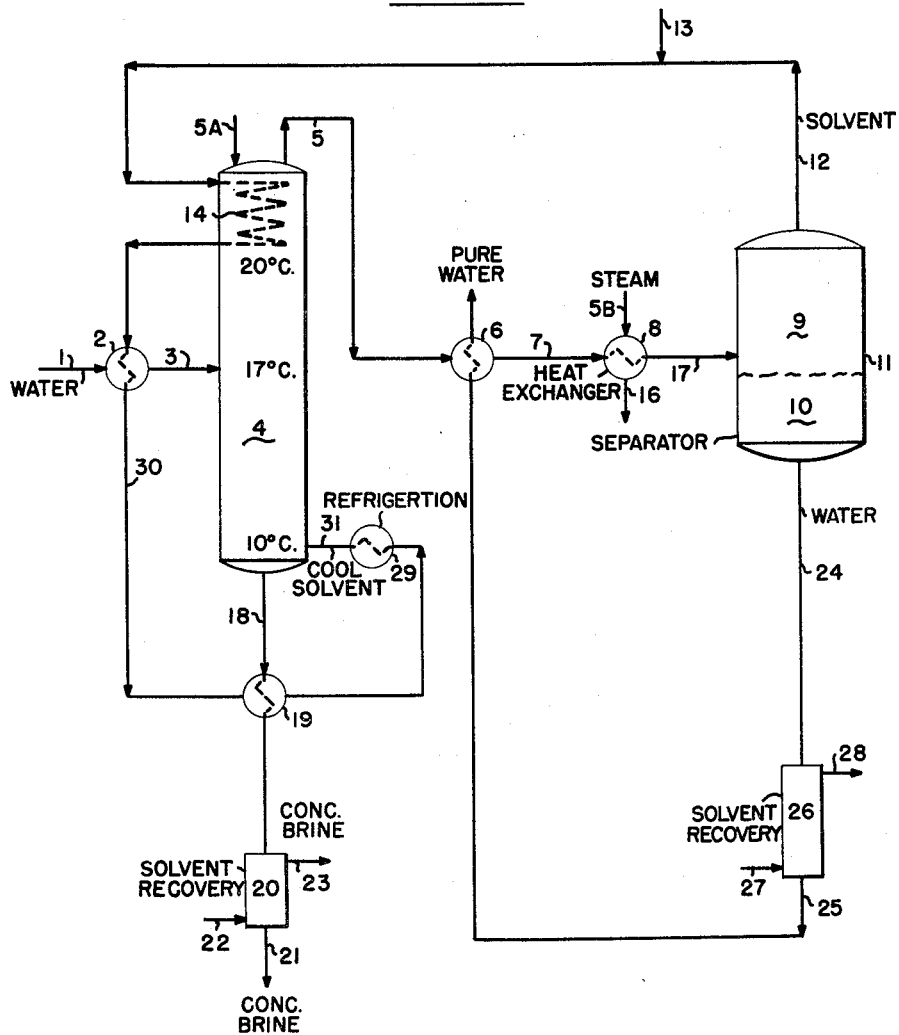

April 6, 1965  C. N. KIMBERLIN, JR., ET AL  3,177,139
DESALINATION BY SOLVENT EXTRACTION
Filed Dec. 2, 1963  2 Sheets-Sheet 2

GRAPH FOR TYPICAL SUITABLE SECONDARY
TERTIARY AMINE SOLVENT

A—B EXTRACTION RANGE & TEMPERATURE
C SEPARATION TEMPERATURE

Charles Newton Kimberlin, Jr.
Roger W. Richardson    Inventors

By *Perry Carvellas*

Patent Attorney

3,177,139
DESALINATION BY SOLVENT EXTRACTION

Charles Newton Kimberlin, Jr., Baton Rouge, La., and Roger W. Richardson, Westfield, N.J., assignors to Esso Research and Engineering Company, a corporation of Delaware
Filed Dec. 2, 1963, Ser. No. 327,254
17 Claims. (Cl. 210—21)

This invention relates to a process for the solvent extraction of water from an aqueous solution. Particularly, this invention relates to a process of solvent extraction of water from salt solutions. More particularly, this invention relates to the solvent extraction of water from saline solutions to obtain potable water. Saline solutions include brackish waters, sea water, and in general, salt solutions of any kind in which the solvents system is compatible. The invention relates to a method of selectively extracting water from a saline solution to obtain a substantially salt-free water and a saline solution of increased concentration of salt.

The invention relates to a process of selectively extracting water from an aqueous saline solution by countercurrent contact of the saline solution with an amine solvent selective for water at a temperature at which the solvent is partially miscible with the water in the saline solution and selectively extracts water over salt. The critical feature of the extraction step is that a temperature gradient is imposed on the countercurrent extraction step and the extraction is carried out over a specified temperature range. Subsequent to the countercurrent extraction step, the extract phase is separated from the raffinate phase, is heated to a temperature at which the extracted water and the solvent are substantially immiscible, allowed to settle by gravity and a substantially salt-free aqueous phase is recovered and a substantially water-free solvent phase is recovered.

Recently a method for the recovery of fresh water from saline waters employing various amine solvents, and mixtures thereof, has been proposed, see U.S. Patent 3,088,909 to Richard R. Davidson and Donald W. Wood, dated May 7, 1963. The referenced process describes a technique of extracting water from a saline solution comprising countercurrently contacting the saline solution with amine solvent or mixtures of amine solvents, whereby the extraction step is carried out isothermally. Subsequently, the extract and raffinate phases are separated and the extract phase is heated to a higher temperature at which temperature the solvent and water in the extract phase are separated. The reference process is limited in application to brackish waters containing only about 3000 to 5000 parts per million of salt. The brine discharge contains only about one percent of salt. That process is limited in the salt content of the feed which it can handle because at the constant temperature conditions employed for the extraction, the solubility of the water in the solvent is decreased markedly as the amount of salt present in the system increases. Thus, at these constant temperature conditions an impractical large circulation rate of solvent is required to extract the water from more concentrated salt solutions.

In order to have an efficient economic solvent extraction process, it is necessary that the solvent recycle rate be kept low and that the solvent loss be minimized. Also, it is necessary that the salt concentration of the effluent raffinate stream; i.e., the treated saline solution be as high as possible in order that the lowest volume of this stream need be treated to recover any dissolved solvent. Energy requirement in this particular system are greatly minimized by utilizing the solvent extraction characteristics of the solvent and its selectivity for water over salts as the basic means to separate the water from the saline solution.

Another characteristic of the solvent is that though the solvent is miscible with water at lower temperatures, at relatively slight increases in temperature the solvent is almost totally immiscible with water. Therefore, the water can be extracted from the saline solution by solvent extraction and then the water can be separated from the solvent by only a slight increase in temperature. These characteristics greatly decrease the energy requirements of the system for recovering, for example, potable water from a saline solution.

In accordance with the present invention desalination is carried out by countercurrent contacting of a saline solution and a solvent stream. The water in the saline solution is partially immiscible in the solvent at the temperatures at which the contacting is carried out. The solvent is selective for water over salt. More water will be extracted at the lower temperatures until the temperature is reached at which the salt solution and the solvent are completely miscible. This temperature is called the LCST temperature and for a particular solvent will be effected by the concentration of salt in the saline solution being contacted. The higher the salt concentration, the greater the reduction in the LCST temperature. In carrying out the extraction it is necessary to maintain the extraction temperature high enough so that there are two separate phases present, the saline solution phase and the solvent phase containing the extracted water. Further, it is desirable to maintain a temperature high enough so that the maximum amount of water in the solvent during the extraction does not exceed about 45% of the extract phase because at concentrations higher than this, the solvent becomes less selective to water and a relatively large amount of salt is extracted with the water.

In accordance with this invention the solvent extraction step is carried out in either a batch or continuous countercurrent contacting system but with a temperature gradient imposed on the extraction.

Applicants recognize that as temperatures increase the amount of water that will remain dissolved in the extract phase decreases. Applicants, however, unexpectedly found that if the temperature is increased while the extract phase is in contact with the raffinate phase (for example, while maintaining the concentration of the salt in the raffinate phase about the same) that the amount of salt in the water in the extract phase decreases rapidly. The amount of water in the extract phase, however, under these conditions, also decreases (this would effect yield of water relative to solvent recycle rate) but at a much slower rate than the decrease in salt concentration. For example, with reference to Table I, the 9% brine solution raffinate in contact with triethyl amine at 19.6° C. will give a solvent phase which dissolves above 10% water, which water has a salt concentration of about 0.22%. The same 9% brine solution raffinate phase, if contacted with solvent at about 5° C., results in a solvent phase containing 44% water, which water has a salt concentration of about 5.6%. Therefore, by carrying out the extraction step where the raffinate phase had a constant 9% salt and imposing a temperature gradient of 5 to 19.7° C. a substantial reduction in salt concentration of the water dissolved in the solvent results. The salt concentration of the water in the extract phase is reduced from 5.6% at 5° to 0.22% at 19.7° C. There is a reduction by a factor of 25, while at the same time the amount of water recovered is reduced only by a factor of about 4½. But as a result of the countercurrent extraction in addition to the imposed temperature gradient there exists a concentration gradient of salt in the raffinate phase.

Generally, the higher the concentration of the salt at a specified temperature in the raffinate phase, the smaller the amount of water the solvent will dissolve.

Again referring to Table I at about 19.7° C. a brine raffinate phase containing 1% salt corresponds to a solvent extract phase which will dissolve 36% water, 3% salt is related to 22.5% water and 6% salt to 16.1% water. And finally a 9% salt in the raffinate phase to 10.1% water in the extract phase. By initiating the extraction step at a lower temperature, for example, 10° C. and terminating it at a higher temperature of about 20° C. and by utilizing a countercurrent contacting system, applicants are thereby able to obtain a very concentrated raffinate phase and an extract phase with a relatively large amount of water which is substantially no salt. Therefore, as the extract phase containing dissolved water and salt proceeds up the column the amount of salt dissolved in the water will be decreased due to the temperature gradient effect of the extraction step and also due to the washing effect of the descending raffinate, while the amount of water in the extract phase will tend to increase due to the decrease in the amount of salt in the raffinate phase that the extract phase "sees" as it proceeds up the column. The temperature gradient can be selected so that the decreasing salt concentration of the raffinate phase is such that it will just balance the desolubilizing effect of the increase in temperature as the extract phase proceeds up the column. In this manner substantially the same amount of water will stay dissolved in the extract phase, which water will gradually decrease in salt concentration due to the lower concentration of salt in the raffinate phase that the extract sees. The salt in the raffinate phase undergoes a gradual build-up in salt concentration as it proceeds down the column and a reduction in temperature. While the solvent extract phase undergoes a gradual rise in temperature and reduction in salt concentration of water dissolved in the extract phase, though the total amount of water dissolved in the extract phase can be made to remain about the same until the end of the extraction step.

The top of the column is at a temperature significantly above the temperature of the input saline solution feed and the extract phase above the saline water input feed point is countercurrently contacted with substantially salt-free reflux water. This effectively washes out substantial amounts of the salt remaining in the water dissolved in the extract phase, and dilutes the salt concentration in the raffinate phase. Additionally, heating the extract phase tends to desolubilize some of the water in the extract phase and provides some or all of the reflux water.

The temperature gradient imposed on the extraction step is such that the maximum amount of water will be dissolved in the solvent in the extractor at the low temperature inlet of the extraction column consistent with selectivity of water over salt. After the extraction step is completed, the extract and raffinate phases are separated and the extract phase is heated and increased in temperature till a temperature is reached at which the water and water dissolving solvent are substantially immiscible. The extract phase is then allowed to settle by gravity and a substantially pure water phase withdrawn and treated to recover any solvent in the water and a salt-free solvent phase containing 5 to 10% dissolved water is recovered and recycled to the system.

By imposing a temperature gradient on the extraction step substantially highly concentrated saline solutions can be treated in accordance with the present invention while still obtaining the benefits of low energy requirements to carry out the separation. Raffinate saline solutions of concentrations up to 12% salt or more can be discharged while feed solutions containing up to 3½ to 4% salt or more can be treated to obtain a substantially salt-free water having less than 500 p.p.m. of salt. This technique allows for treating of a minimum volume of saline solution feed which substantially reduces the solvent recycle rate and the energy requirements for distilling or otherwise recovering solvent from the raffinate phase.

FIGURE 1 of the drawings is a schematic flow sheet of a simplified solvent extraction process for saline waters.

Figure 2:
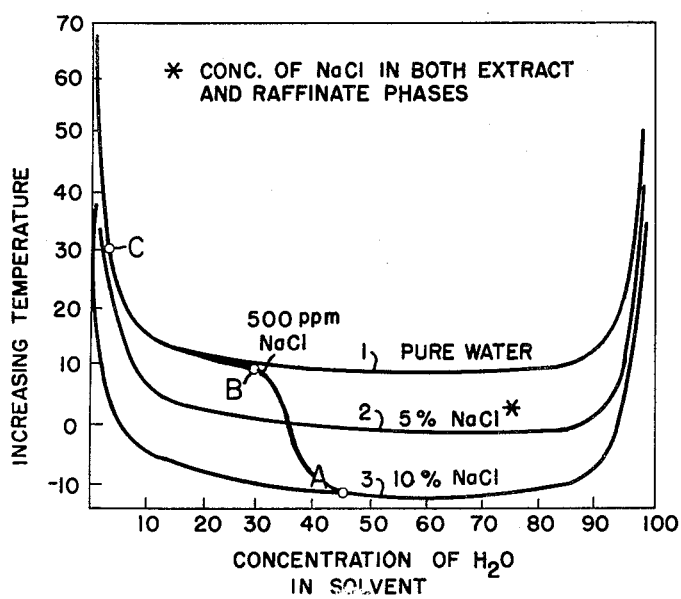

FIGURE 2 is a graph showing the solubility curve of water in a typical amine solvent as related to temperature. Curves are also presented showing the depression of the curve due to addition of salt to the system.

The preferred solvent that can be used in accordance with this invention are secondary and tertiary amines with 5 to 7 carbon atoms per molecule which have almost ideal physical properties for use in the desalination of water by solvent extraction. The low solvent extraction temperatures make it possible to use low level heat and by selecting a particular solvent or solvents and/or varying the particular solvent mixture, the operating temperature for the extraction and separation steps may be varied to suit ambient conditions.

Salt is almost completely insoluble in these solvents. With water they have lower critical solution temperatures (LCST). At temperatures below the LCST they are completely miscible with water; at temperatures only moderately above the LCST, they are almost completely immiscible. Thus, the bulk of the solvent can be recovered for recycle by merely heating the extract and raffinate phases to a temperature moderately above the LCST. The proper selection of solvent will allow the extraction to be conducted in a convenient temperature range and decrease the heating and cooling requirements.

The secondary and tertiary amines which are used in conjunction with this process may be used by themselves or in admixture with each other. Selection of solvents can produce a tailor-made solvent to fit the preferred operating conditions for a particular separation. The solvents and solvents ratios if mixtures are used will vary with the separation to be carried out, the ambient temperatures where the separation is to be carried out, and the salt concentration in the feed water as well as the minimum salt concentration desired in the water product. Especially useful amine solvents for this process are those having the general formula $R_1—N(R_2)—R_3$ wherein $R_1$ can be hydrogen or alkyl, and $R_2$ and $R_3$ can be alkyl or $C_3$ or $C_4$ alkenyl radicals such as allyl, methyl allyl, and butenyl, and the total number of carbon atoms in the molecule is 4 to 7. Examples of the compounds that can be used are listed below.

Triethylamine
Methylethylisopropylamine
Methylethyl-n-propylamine
Dimethyl-secondary-butylamine
Dimethyl-tertiary-butylamine
Dimethylisobutylamine
Dimethylethylamine
Methyldiethylamine
Dimethylallylamine
Dimethyl-n-propylamine
Dimethylisopropylamine
Diisopropylamine
Di-n-propylamine
Di-allylamine
N-methyl-n-amylamine
N-ethyl-n-butylamine
N-ethyl-sec-butylamine
N-ethyl-tertiary-butylamine
N-ethyl-n-propylamine
N-ethyl-isopropylamine
N-methyl-n-butylamine
N-methyl-sec-butylamine
N-methyl-iso-butylamine
N-methyl-tertiary butylamine
Dimethyl, 1,1-dimethylpropylamine
Dimethyl, 1-methyl butylamine Particularly preferred compounds for carrying out applicants' process are triethylamine, methyldiethylamine, dimethylisopropylamine, dimethyl tertiary butylamine, and mixtures thereof.

The aqueous solutions that can be contacted with the above-mentioned solvents to carry out selective water extraction from the solutions can contain any compound which is water soluble and which compound is not soluble in the solvent used and will not react with the solvent. In a more specific aspect of the present invention saline water solutions are contacted with the solvents to selectively remove substantially salt-free water. Saline waters include brackish water, sea water and in general salt solutions of any kind in which the solvent system is compatible. This would include sodium chloride salt solutions of from between 0.5 wt. percent chloride to about 10% sodium chloride.

The critical feature of the present invention is to carry out the extraction step over an imposed temperature gradient rather than isothermally. When an isothermal extraction is carried out the amount of salt present in the water dissolved in the extract phase is set by equilibrium conditions at that temperature and these are related to the amount of salt in the saline solution raffinate phase. Therefore, isothermal condition at best can only reduce the salt concentration a relatively minor amount. To obtain potable water, therefore, it is necessary that the saline solution fed to the process where the extraction is carried out isothermally be relatively dilute; namely, less than about 1% salt concentration. The raffinate phase discharge will contain around 1% or slightly more salt concentration. Therefore, it is a novel feature of this invention to carry out the extraction step over an imposed temperature gradient. The temperature gradient is selected so that during the countercurrent extraction, the temperature which the extract phase sees is gradually increase, while the salt concentration of the raffinate that the extract phase sees is gradually decreased. The increase in temperature of the extract phase and the decrease in salt concentration of the raffinate phase are adjusted so that one compensates for the other and the total amount of water dissolved in the extract phase remains about the same throughout the extraction; e.g., 30 to 40%, while the salt concentration of the water in the extract phase is substantially decreased during the countercurrent contacting and extracting step. The temperature gradient imposed on the extraction step is selected so that, at the minimum temperature of the extraction step, the solvent will dissolve about 35 to 45% water, whereas at the maximum temperature of the extraction step, the solvent will still contain about 25 to 35% water. The maximum temperature of the extraction step is selected so that the solvent will still contain at least 20% water. Minimum solvent extraction temperature can be 0° C. to 40° C., generally 5° C. to 30° C., and preferably about 10 to 20° C. This minimum temperature will depend upon the environmental conditions at which the extraction is to be carried out, the concentration of the saline water being treated, and the selection of solvent. The extraction temperature gradient imposed upon the extraction step will be between about 5 to 30° C., more generally 10 to 25° C., preferably about 15 to 20° C. The maximum extraction temperature will be 20 to 70° C., generally 20 to 50° C. As the water dissolved in the extract phase approaches pure water and the water in the raffinate phase; that is, the water in contact with the extract phase, due to reflux becomes more dilute, the solubility curve of water dissolved in the solvent phase approaches that of the pure water curve.

The solubility curve for pure water for a typical amine solvent is shown in FIGURE 2 of the drawings. Addition of salt to the water being treated will lower this curve on the temperature scale but it will still maintain about its same shape. Therefore, if the water being treated has 0% salt (curve 1), it will have the pure water curve. If it has 5% salt, it will be lower (curve 2), and if it has 10% salt it will be still lower (curve 3). As the extraction is being carried out the salt in the water in the extract phase is reduced and the salt concentration of the feed being treated; i.e., raffinate phase, is gradually increased. The salt concentration in the raffinate layer decreases in the area in the tower above the water feed inlet due to reflux and the salt concentration in the water layer becomes very diluted and the solubility curve approaches that of the pure water curve.

The separation temperature is that temperature at which the extract phase, after being separated from the raffinate phase, is heated at which the water becomes substantially immiscible with the solvent. The solvent is selected so that it requires a minimum increase in temperature from the top of the extraction tower temperature to the separation temperature. The temperature is selected so that the amount of water that remains dissolved in the separated solvent to be recycled is less than about 5 to 10% water. Depending on the system used, this temperature will be 20 to 80° C. or generally 20 to 60° C., and specifically about 30 to 50° C. The temperature difference between the reflux temperature and the separation temperature is desirable to be kept at a minimum with the requirement that less than about 5 to 10% water be present in the separated solvent, but can be 5 to 40° C., generally 5 to 30° C., and specifically 10 to 20° C. The factor which concerns the economics most, other than solvent loss from the system, is the amount of solvent recycle that is required to obtain a specific quantity of desired salt concentration water. Solvent to saline water feed ratios will generally be in the range of 0.5 to 10, more generally 1 to 5, and preferably 2 to 3. The solvent ratio is selected so that maximum water is extracted from the saline feed solution per recycle rate of solvent to system. As the extract phase continues up the column after the countercurrent contact with the feed, it passes the feed point of the saline feed solution and goes into the reflux section of the tower. In this section the separate water phase, in the two phase extraction step, can be provided by reflux of fresh water. This reflux section can be heated above the temperature existing at the point of water feed entry and at this temperature some water dissolved in the solvent is thrown out of solution. This may serve as a reflux or additional reflux can be added. The total percentage reflux will be 10 to 50%, and preferably about 25 to 35% by volume of the water in the extract phase solvent.

The amount of reflux required to obtain water product of the desired purity obviously affects the economics of the system. The more reflux that is used, the purer the recovered water will be. However, the less water recovered per volume of solvent recycle.

The process will be explained in more detail with reference to FIGURE 1 of the drawings. FIGURE 1 is a diagrammatic flow diagram illustrating the method of the present invention. Valves, pumps, heaters and similar apparatus have been omitted for the sake of simplicity. It is to be understood that those are to be provided as required as will be apparent to those skilled in the art. Referring to the drawing, saline water having a 2 to 4% concentration in sodium chloride is fed through line 1 into heat exchanger 2 whereby the temperature of the water feed is adjusted to a temperature intermediate the maximum extraction temperature and solvent input temperature; for example, about 16° C. The thus heated water is passed into extractor 4 through line 3 and passes downwardly therethrough countercurrently to solvent entering through line 31 at the bottom of the extractor. The solvent, prior to entering the extractor, is cooled by heat exchanger 29 to a temperature a little below the minimum extraction temperature and is maintained; for example, at about 7° C. The temperature gradient in extractor 4 between the top and bottom of the extractor is maintained at about 12° C. by controlling the rate of solvent feed and water feed and the degree of cooling of this solvent and the amount of heating in the heater section 14 of the extractor (which heating provides part or all of the reflux). By controlling the temperature of these two streams and the volume of throughput of each stream, the temperature gradient in the extractor can be carefully controlled. Additional control can be obtained by separately heating or cooling sections of the tower externally. The raffinate is removed through line 18 and will contain 8 to 12% or more salt concentration. The cool raffinate is removed from extractor 4 through line 18 and is indirectly contacted with recycle solvent in exchanger 19. This contact serves to precool the solvent prior to the adding of refrigeration to the solvent. The raffinate is then sent to solvent recovery stage 20 as will be explained hereinafter.

The extract phase as it continues to rise in extractor 4 countercurrently to the descending raffinate phase, is gradually heated from about 9 to 10° C. to about 22° C. in the column. Part of the heat is added through preheating the saline water solution to be treated and the remainder is added by heating the extract phase just before it leaves the extractor column by heating means 14 and the descending warm reflux water which is separated out of the extract phase due to the heating provided by heater 14. The extract is removed overhead from the extractor 4, through line 5. Additional reflux water, which has been preheated to the desired temperature, may be admitted in the top of the tower as necessary, through line 5A.

The thus warmed extract phase is then heated to the separation temperature and sent to separator 11, where it is allowed by gravity settling to separate into two phases, a substantially water-free solvent phase 9 and a substantially solvent-free water phase 10. Heat to raise the temperature of the extract phase to the separation temperature can be provided by any suitable heating means. For example, a suitable heat exchange means whereby heat is recovered from the hot solvent in layer 10 by suitable heat exchange in exchanger 6 can be provided. Additional heat can be provided from a low value heat source; for example, from low temperature steam, introduced through line 5 and removed through line 16 in a suitable heat exchanger 8.

The ratio of solvent to saline water feed is controlled so that the solvent ratio of about 3 to 1 is used. At the initiation temperature of the extraction of about 10° C. and the outlet temperature of the extract phase of about 22° C. the temperature gradient is established in the extractor column 4 of about 12° C. The extract phase being removed from the extractor at a temperature of about 22° C. needs only to be increased by about 10° C. to a temperature of about 32° C. to provide substantial immiscibility between the solvent and water dissolved in the solvent. A sufficient amount of a substantially salt-free water can be refluxed in the tower, which reflux can be provided by heating up the extract phase by heating means 14 and provide reflux of about 25 to 35% of the extract water.

In the scheme illustrated in FIGURE 1, which is merely one proposed scheme, several heat exchange economies are provided. For example, the heat from the recycle solvent from the separator is absorbed in the top of the tower to provide reflux, and is also used to provide preheat for the saline water feed. The solvent is further cooled by indirect contact with the cold concentrated brine solution removed from extractor 4, in heat exchanger 19, and refrigeration is added in heat exchanger 29. The heat from the water phase, before or after solvent recovery from the water phase, is recovered in heat exchanger 6 to provide additional heat for the solvent extract phase removed in the extractor. In this process a concentration of sodium chloride in the raffinate layer will be about 8 to 12% or more.

The economics of this process is severely affected by the loss of solvent. The solvent must be recovered from the raffinate layer through a suitable solvent recovery stage 20 and also recovered from the water product layer by suitable solvent recovery layer system 26. The solvent separated in phase 9 will contain about 5 to 10% water at the separation temperature used and is recycled to the process. Make-up solvent is added through line 13 together with solvent recovered from the two solvent recovery systems. The solvent can be suitably recovered from the water product by heating to distill the solvent overhead or by suitable solvent extraction with a solvent which is immiscible with water and which selectively dissolves the amine solvent. The solvent recovery from the brine solution can be by heating it to distill it off, but preferably since this is at low temperature, a suitable selective solvent extraction technique can be used. All the above means for recovery of solvent are known in the art and need not be further described. The product water can be passed over charcoal or other adsorbent such as silica gel or adsorbent clay to remove any small amounts of solvent remaining in the water. The adsorbent can be regenerated when required and the amines can be recovered.

FIGURE 2 of the drawings shows a graph of a typical amine solvent of this invention wherein the weight percent of water dissolved is plotted against temperature. Where there is no sodium chloride in the system, solubility of the water in the solvent is shown by curve 1. This curve represents the amount of water that will stay in solution in a typical solvent at a particular temperature. Curve 2 shows the amount the solubility curve will be depressed by adding about 5% sodium chloride to the system. The amount of salt in the water dissolved in the solvent will be substantially less than the amount of salt in the water phase. Curve 3 shows a similar curve for a system containing about 12% water.

It can be seen from these typical curves that the solubility of water in a typical solvent at a specific temperature is substantially reduced as the salt content of the water phase increases. By carrying out a countercurrent solvent extraction step with an imposed temperature gradient, and a suitable reflux and by proper selection of the maximum and minimum temperatures of the imposed temperature gradient, a separation can be carried out whereby the solvent will maintain about a 30 to 45% water concentration while the salt concentration is gradually decreased. For example, consider a countercurrent contact tower where the extract phase at the top of the tower in the reflux section sees water in the raffinate phase containing about 0.25% sodium chloride and the extract phase at the bottom of the tower sees raffinate phase containing 12% sodium chloride. At the minimum temperature of the extract step of about 5° C., represented by point A on the graph, the solvent extract phase will dissolve about 44% water and the salt concentration of the water in the extract phase will be about 5½% salt. As the extract phase rises in the contact tower and is heated to about 10 degrees while being contacted countercurrently with descending raffinate phase having about 5% sodium chloride the water concentration in the extract phase will be about 40%, and the salt concentration of the water in this phase about 4½%. At the top of the tower where the extract contacts reflux, having about 0.25% salt and at a temperature of about 20° C., the extract phase will comprise about 30% water and will have a salt concentration of about 500 p.p.m. As the water in the extract phase becomes substantially free of salt, and the water in the raffinate phase with which it has been contacted becomes more dilute in salt, the curve of solubility of water in the solvent approaches that of the pure water system represented by curve 1. A suitable separation temperature would be about 40° which is marked by point C. The temperature gradient imposed on extraction step is measured by points A and B on the graph. In going from the maximum extraction temperature 20, point B, to the separation temperature 40, point C, only a 20° increase is required to separate the extract phase into water having less than 500 p.p.m. sodium chloride and amine solvent. The separated solvent phase will contain less than about 5% water. The solvent can then be recycled directly to the process.

The invention is further illustrated by the following examples.

EXAMPLE I

In order to illustrate the solvent-water-salt relationship, a 1 to 1 ratio of triethylamine solvent to a saline solution were mixed at varying temperatures and concentrations of sodium chloride. The water-feed to the extraction steps were varied between 1 and 9 wt. percent sodium chloride and extractions were carried out in temperatures between 5 and 19.7° C. In each case the solvent and water feed were mixed, then allowed to separate into two layers and each layer analyzed for water content, solvent content, and salt concentration. The results obtained are reported in the following Table I.

*Table I*

DISTRIBUTION COEFFICIENTS $H_2O$-TRIETHYLAMINE-NaCl SYSTEM RATIO BRINE TO SOLVENT 1:1

| Temp., °C. | Feed $H_2O$ Wt. Percent NaCl | Extract Phase, Wt. Percent | | | Raffinate Phase, Wt. Percent | | | α | LCST, °C. |
|---|---|---|---|---|---|---|---|---|---|
| | | $H_2O$ | NaCl | Solv. | $H_2O$ | NaCl | Solv. | | |
| 19.7 | 0 | | | | | | | | 19.6 |
| 19.7 | 1 | 36.0 | .152 ¹(.42) | 63.8 | 88.0 | 1.22 ¹(1.39) | 10.75 | 3.3 | 16.9 |
| 19.6 | 3 | 22.5 | .115 (.51) | 77.4 | 89.2 | 3.25 (3.53) | 7.6 | 6.95 | 10.9 |
| 19.6 | 6 | 16.1 | .068 (.42) | 83.8 | 86.5 | 8.35 (8.8) | 5.2 | 22.8 | 5.8 |
| 19.6 | 9 | 10.1 | .022 (.22) | 89.9 | 87.2 | 8.73 (9.1) | 4.1 | 45 | <1.9 |
| 17.0 | 3 | 32.1 | .34 (1.06) | 67.6 | 88.0 | 3.44 (3.76) | 8.6 | 3.7 | 10.9 |
| 14.6 | 3 | 43.4 | .88 (1.98) | 55.7 | 85.7 | 3.72 (4.16) | 10.6 | 2.14 | 10.9 |
| 14.6 | 6 | 25.3 | .385 (1.5) | 74.3 | 87.0 | 6.73 (7.2) | 6.3 | 4.92 | 5.8 |
| 14.6 | 9 | 16.2 | .162 (.98) | 83.6 | 86.2 | 9.17 (9.6) | 4.7 | 10.6 | <1.9 |
| 9.5 | 6 | 40.8 | 1.97 (4.6) | 57.2 | 83.6 | 7.8 (8.5) | 8.6 | 1.92 | 5.8 |
| 9.5 | 9 | 28.0 | .82 (2.8) | 71.2 | 84.8 | 9.9 (10.5) | 5.3 | 3.97 | <1.9 |
| 5.0 | 9 | 44.4 | 2.62 (5.6) | 53.0 | 83.9 | 11.5 (12.1) | 4.6 | 2.3 | <1.9 |

¹ Values in parentheses are on a NaCl+$H_2O$ basis.

The equilibrium data for the water-triethylamine-sodium chloride system at the several temperatures presented in Table I show that by proper adjustment of the extraction temperature and the maintaining of a temperature gradient in the extraction zone, it is possible to apply the solvent extraction process to the desalination of salt solutions at least as concentrated as sea water (3.5%) and to discharge a brine containing at least 12% salt. The decrease in the ability of the solvent to extract water at constant temperature as the salt content of the feed water was increased was clearly shown in Table I, thus, when triethylamine was contacted with 1% salt solution at 19.7° C. the extract phase contained 36.0% water, but when the solvent was contacted with 9% salt solution at 19.6° C. only 10.1% water was contained in the extract phase. However, the data also show that the presence of salt lowers the LCST, thus permitting the extraction operation to be conducted at a temperature below the normal LCST with pure water; thus, for triethylamine the LCST with pure water was 19.6° C., but with 9% salt solution it was below 1.9° C. Furthermore, as the temperature was lowered the ability of the solvent to extract water from a solution of a given salt content was increased; thus, when triethylamine was contacted with 9% salt solution at 19.6° C. the extract phase contained only 10.1% water, but when the same experiment was conducted at 5.0° C. the extract phase contained 44.4% water. The separation factors (α's) were not adversely affected by decreasing the temperature as the salt content of the feed water was increased. All of the alpha values shown were extremely favorable with the lowest being 1.9.

EXAMPLE II

A countercurrent extraction is carried out in extraction apparatus consisting of an equivalent to 18 theoretical plates packed column, 18 feet in height. Feed water is introduced into the 18 foot column at a point about 3 ft. from the bottom of the column. Salt water feed containing about 3.5% sodium chloride is introduced at a temperature of about 16° and descends in the column countercurrently to a rising stream of solvent which is introduced at about 5° C. to give a minimum extraction temperature of 9.5° C. The ratio of triethylamine solvent to salt water is about 2.5 to 1. The temperature of the salt water and of the solvent and rate of introduction is controlled so that the temperature gradient existing between the bottom of the tower where the solvent is introduced and at the 3 ft. mark where the salt water is introduced is about 16° C. The last 15 feet of the 18 foot column is used for rectification and in the top of the column reflux is provided by heating the extract phase to a temperature of about 22° C. adding heat by indirect contact in the top of the tower. This increase in the temperature causes about 30% of the water in the solvent extract phase to come out of solution and the water is used to wash salt out of the water remaining in the extract phase as it rises in the column. About 70% of the water remaining in the extract phase is removed and contains about 118 p.p.m. sodium chloride. The extract phase is then separately heated to a temperature of about 30° C. at which temperature the water is substantially immiscible with the triethylamine solvent and allowed to separate into two layers. The solvent will comprise about twice the volume of the water and will contain in solution 5% water.

As the salt water feed goes down the column, in admixture with the reflux from the top of the column, it continually increases in sodium chloride concentration and is removed from the bottom of the column at a temperature of about 9.5° C. and contains a salt concentration of about 15% sodium chloride.

In addition to desalination of salt water the invention can be employed to concentrate various brines for the recovery of valuable salts. Other advantages accrue from this technique. The highly concentrated brine that is discharged can be an economic source of bromine and potassium and in certain areas make the production of solar salt attractive. The small volume of the discharge brine means a lower cost for the recovery of solvent from this stream. It also means that a smaller volume of feed water need be handled to yield a given volume of desalinated water.

The process is versatile with respect to energy sources, since essentially free heat can be obtained from such low value sources as exhaust steam, gases of industrial engines, cooling the water from condensers, and from any other source with a relatively low temperature heat. The process lends itself well to adaptation to existing environmental conditions. Feed water ranging in temperature from 15 to 55° C. can be handled by altering the nature of the solvent composition to give the most economic advantages. In those processes requiring high temperatures, the problems of scaling and corrosion present formidable barriers to economic production of fresh water. In solvent extraction the problem of scaling is eliminated by the low temperature of the operation and the solvents eliminate the growth of sliming and encrusting organisms. Corrosion is reduced because of the inhibitory reaction of amines towards the corrosion of iron.

Although the invention has been described primarily with regard to the production of water from the extract phase, it also is useful for low temperature dewatering in the production of concentrates from the raffinate phase.

It is apparent from the reading of the foregoing specification that the invention is susceptible to various changes and modifications without departing from the spirit and scope thereof.

What is claimed is:

1. In a solvent extraction zone for the extraction of water of reduced salt concentration from an aqueous salt solution of greater salt concentration by contacting said salt solution with a water selective amine solvent characterized by the formula $$R_1—N(R_2)—R_3$$

wherein $R_1$ is a member of the group consisting of hydrogen and alkyl, $R_2$ and $R_3$ are members of the group consisting of alkyl and alkenyl radicals having 1 to 4 carbon atoms, the total number of carbon atoms in each amine being 4 to 7, to form in the zone an extract phase consisting essentially of said amine and dissolved water, and a raffinate phase consisting essentially of water with salt, the improved method comprising providing a temperature gradient within the solvent extraction zone, separating the said raffinate phase of increased salt concentration from the extract phase, heating the extract phase to cause separation of water from the amine solvent, and then recovering water of substantially reduced salt concentration.

2. The method of claim 1 wherein the extract phase is heated to a temperature at which the solvent is substantially immiscible with the water dissolved therein, and then separating the water from the amine solvent.

3. The process of claim 2 wherein the minimum extraction temperature is 0 to 40° C. and the imposed temperature gredient is 5 to 30° C.

4. The process of claim 2 wherein the maximum extraction temperature is 20 to 70° C. and the separation temperature is 5 to 40° C. above the extraction temperature.

5. The process of claim 2 wherein the ratio of solvent to salt solution is 0.5/1 to 10/1.

6. In a solvent extraction zone for the extraction of water of reduced salt concentration from an aqueous salt solution of greater salt concentration by countercurrently contacting said salt solution with a water selective amine solvent characterized by the formula $$R_1—N(R_2)—R_3$$

wherein $R_1$ is a member of the group consisting of hydrogen and alkyl, $R_2$ and $R_3$ are members of the group consisting of alkyl and alkenyl radicals having 1 to 4 carbon atoms, the total number of carbon atoms in each amine being 4 to 7, to form in the zone an extract phase consisting essentially of said amine and dissolved water, and a raffinite phase consisting essentially of water with salt, the improved method comprising providing a temperature gradient within the solvent extraction zone ranging from about 5° C. to about 30° C., said temperature gradient being one wherein the solvent input is at the low temperature and the extract withdrawal phase at the higher temperature, separating the said raffinate phase of increased salt concentration from the extract phase of reduced salt concentration, heating the extract phase to sufficiently higher temperature so that a solvent extract phase separates from an aqueous phase and becomes substantially immiscible therewith, separating the water from the solvent extract phase and recovering water of substantially reduced salt concentration, and recovering also a raffinate phase of increased salt concentration.

7. The process of claim 6 wherein reflux water of substantially reduced salt concentration is added to the extraction zone.

8. The process of claim 7 wherein the separation of the water from the extract phase is performed at a temperature ranging from about 5° C. to about 40° C. above the maximum extraction temperature and the reflux consists of about 10 to 50% of the volume of the extracted water.

9. The process of claim 7 wherein the maximum separation temperature is 20 to 80° C.

10. A method for obtaining water of reduced sodium chloride concentration from a saline solution which comprises countercurrently contacting said saline solution with a solvent selective for water selected from the group consisting of triethylamine, methyl diethylamine, dimethyl isopropylamine, dimethyl tertiary butyl amine, and mixtures thereof, whereby a temperature gradient is imposed on the extraction, said imposed gradient having the solvent input at the low temperature and the extract phase withdrawal at the high temperature, providing reflux water of substantially reduced salt concentration, thereafter separating a raffinate phase of increased salt concentration and an extract phase containing dissolved water of substantially reduced salt concentration, heating the separated extract phase to a temperature whereby the water dissolved in the solvent extract phase becomes substantially immiscible with the solvent, separating the water from the solvent phase, recovering a water phase of substantially reduced salt concentration, a solvent phase, and a raffinate phase of substantially increased salt concentration.

11. The process of claim 10 wherein the imposed temperature gradient is 5 to 30° C., the separation temperature 5 to 40° C. above the maximum extraction temperature and the reflux consists of about 10 to 50% by volume of the volume of extracted water.

12. The process of claim 10 wherein the minimum extraction temperature is 5 to 30° C., the maximum extraction temperature 20 to 50° C., the imposed temperature gradient 10 to 25° C., the separation temperature 5 to 30° C. above the maximum extraction temperature, and the percentage of reflux 25 to 35% by volume of the volume of the extracted water.

13. The process of claim 10 wherein the solvent to salt solution ratio is 1/1 to 5/1.

14. The process of claim 10 wherein the separation temperature is 20 to 60° C.

15. A process of obtaining potable water having less than 500 p.p.m. of sodium chloride from salt water having 3.5 to 4% sodium chloride which comprises countercurrently contacting said salt solution with a solvent in ratio of solvent to solution of 1/1 to 5/1, said solvent being selective for water, selected from the group consisting of triethylamine, methyl diethyl amine, dimethyl isopropylamine, dimethyl tertiary butylamine, and mixtures thereof, whereby a temperature gradient is imposed on the extraction, said temperature gradient being between 5 and 30° C., said imposed gradient having the solvent input at the low temperature and the extract phase withdrawal at the high temperature, providing 5 to 35% by volume of reflux water of substantially reduced salt concentration, thereafter separating a raffinate phase of increased salt concentration and an extract phase containing dissolved water of substantially reduced salt concentration, heating the separated extract phase to a temperature 5 to 40° C. above the maximum extraction temperature whereby the water dissolved in the solvent extract phase becomes substantially immiscible in the extract phase and the water concentration is reduced to 5 to 10% by volume of the solvent, separating the water from the solvent phase, recovering a water phase containing less than 500 p.p.m. of sodium chloride, a solvent phase and a raffinate phase of substantially increased salt concentration.

16. The process of claim 15 wherein the recovered raffinate phase contains at least 10% dissolved sodium chloride.

17. The process of claim 15 wherein the solvent to triethylamine, the minimum extraction temperature is about 10° C., the maximum extraction temperature about 22° C., the separation temperature about 30° C. and the ratio of solvent to salt solution is about 2/1 to 3/1.

References Cited by the Examiner

UNITED STATES PATENTS 3,088,909   5/63   Davison et al. _____ 210—22

OTHER REFERENCES

"Report No. 22," Research on Liquid-Liquid Extraction for Saline Water Conversion, by The Agricultural and Mechanical College of Texas for Office of Saline Water, December 1958 (pages 1–14). Copy in 210–S.W.D.

"Report No. 27," Saline Water Conversion, Advances in Chemistry Series, by American Chemical Society, Washington, D.C. Copyright 1960 (pages 40–49). (Copy in Scientific Library.)

MORRIS O. WOLK, *Primary Examiner.*